United States Patent [19]

McGarrah et al.

[11] Patent Number: 5,018,692

[45] Date of Patent: May 28, 1991

[54] VENDING MACHINE ANTIROCK MECHANISM

[75] Inventors: Robert G. McGarrah; Christopher M. McGarrah, both of Brookfield, Conn.

[73] Assignee: PepsiCo Inc., Purchase, N.Y.

[21] Appl. No.: 385,693

[22] Filed: Jul. 26, 1989

[51] Int. Cl.[5] ............................................ F16M 11/24

[52] U.S. Cl. ................................ 248/188.3; 194/204; 248/188.8

[58] Field of Search ............... 248/188.3, 188.8, 188.5, 248/649; 221/282, 285, 21; 312/253, 255; 194/200, 202, 204

[56] References Cited

U.S. PATENT DOCUMENTS

| | | | |
|---|---|---|---|
| 1,390,651 | 9/1921 | Solberg | 312/255 X |
| 2,719,688 | 10/1955 | Seifert | 248/188.5 |
| 2,752,218 | 6/1956 | Shea, Sr. | 312/255 |
| 3,298,492 | 1/1967 | Duncan | 194/204 |
| 3,482,110 | 12/1969 | Robinson | 194/204 X |
| 4,497,390 | 2/1985 | Wilson | 248/188.3 X |
| 4,673,061 | 6/1987 | Zeist | 248/188.3 X |
| 4,770,275 | 9/1988 | Williams | 248/188.3 X |
| 4,784,362 | 11/1988 | Wong | 248/188.3 X |
| 4,798,359 | 1/1989 | Ball | 248/188.3 X |
| 4,801,114 | 1/1989 | Price | 248/188.3 X |

FOREIGN PATENT DOCUMENTS

| | | | |
|---|---|---|---|
| 1024220 | 2/1958 | Fed. Rep. of Germany | 248/188.3 |
| 2844467 | 4/1980 | Fed. Rep. of Germany | 194/204 |
| 663338 | 12/1987 | Switzerland | 248/188.3 |

*Primary Examiner*—Carl D. Friedman
*Assistant Examiner*—Daniel Hulseberg
*Attorney, Agent, or Firm*—Scully, Scott, Murphy & Presser

[57] ABSTRACT

A vending machine antirock mechanism is disclosed which is a safety feature for a soft drink vending machine to prevent rocking of the vending machine. The antirock ratchet mechanism prevents oscillatory rocking of a vending machine by a potential pilferer until a sufficient forward tilt of the machine is attained to possibly allow soft drink products to be pilfered from the machine through the product dispensing chute. A safety problem has been incurred here as the vending machines are very heavy, and can possibly fall on top of and injure the person rocking the machine or other persons in the proximity thereof. The present invention is designed to prevent such rocking motions by mounting an antirock mechanism at one or more locations on the front of the machine, with a vertically movable antirock member therein, such that when the machine is first rocked backwardly, the antirock member moves downward vertically to the floor, and locks in an extended position to prevent the machine from rocking forwardly again. The machine is then jammed in a rearwardly tilted position to prevent oscillatory rocking thereof.

10 Claims, 7 Drawing Sheets

VENDING MACHINE ANTIROCK MECHANISM

BACKGROUND OF THE INVENTION

1. Field of the Invention

The present invention relates generally to a safety mechanism for vending machines, and more particularly pertains to a vending machine antirock mechanism, which is a safety feature for a soft drink vending machine to prevent rocking of the vending machine, which might possibly lead to the vending machine tipping over and injuring the person rocking the vending machine or other persons in the proximity thereof.

2. Discussion of the Prior Art

The vending machine antirock mechanism of the present invention is a safety feature for a soft drink vending machine to prevent oscillatory rocking of the machine by a potential pilferer until a sufficiently forward tilt of the machine might be attained to possibly dislodge soft drink products within the machine to fall through the product dispensing chute. A safety problem has been incurred in this situation as vending machines are very heavy, and can possibly fall on top of and injure the person rocking the machine or other persons in the proximity thereof. The present invention is designed to prevent such rocking motions by mounting an antirocking mechanism on the front of the vending machine, such that when the machine is first rocked backwardly, the antirocking mechanism assumes an extended position to prevent the machine from rocking forwardly again. The machine is then jammed by the antirocking mechanism in a rearwardly tilted position, up to a position of contact with an adjacent rear wall, typically four to six inches away.

SUMMARY OF THE INVENTION

Accordingly, it is a primary object of the present invention to provide an antirock mechanism as a safety feature for a soft drink vending machine to prevent oscillatory rocking of the machine by a potential pilferer until a sufficiently forward tilt of the machine might be attained to possibly dislodge soft drink products within the machine causing them to fall through the product dispensing chute.

A further object of the subject invention is the provision of a movable antirocking mechanism mounted on the front of the vending machine, such that when the machine is first rocked backwardly, the antirocking mechanism extends to prevent the machine from rocking forwardly again, thereby jamming the machine in a rearwardly tilted position.

In accordance with the teachings herein, the present invention provides an antirock mechanism attached to the base of a vending machine. The antirock mechanism comprises at least one vertically movable antirock member, vertically movable relative a locking member secured to the vending machine, with the movable antirock member moving vertically downwardly relative to the locking member when the vending machine is tilted or rocked. The movable antirock member locks relative to the locking member in a vertically downward position to support the vending machine in an initial backward tilted position to prevent oscillatory rocking thereof.

In one disclosed embodiment, the vertically movable antirock member comprises a vertically slideable ratchet bar supported for vertical downward movement when the vending machine is tilted or rocked backwardly and having a plurality of ratchet teeth positioned along its length. The locking member engages and locks relative to the ratchet teeth after the vending machine is initially tilted.

In a further disclosed embodiment, the locking member defines an inverted frustoconical aperture therein. A vertically slideable antirock member is loosely positioned therein for vertical downward movement when the vending machine is tilted. The slideable antirock member has a plurality of spaced grooves along its length, one of which engages the bottom of the inverted frustoconical aperture to lock and support the vending machine in an initial backwardly tilted position.

In another disclosed embodiment, the antirock mechanism comprises a plurality of nested vertically slideable members, preferably nested cylindrical members, each of which can lock in a vertical downward position relative to an adjacent nested slideable member.

In yet a further disclosed embodiment, the antirock mechanism comprises a piston having a plurality of spaced expandable rings mounted thereon and positioned in a cylinder. As the vending machine is initially tilted, the piston is withdrawn from the cylinder and the spaced expandable rings expand as they are withdrawn from the cylinder, thereby preventing the piston from retracting back into the cylinder.

In an additional embodiment, the antirock mechanism comprises a piston mounted in cylinder, and the volume defined between the piston and cylinder communicates with a reservoir of hydraulic fluid through a one way check valve. This arrangement allows the piston to withdraw from the cylinder as the vending machine is initially tilted backwardly, but does not allow the piston to retract into the cylinder.

In yet another embodiment, the antirock mechanism comprises a plurality of different length legs pivoted about a common pivot which extends along the front of the vending machine.

BRIEF DESCRIPTION OF THE DRAWINGS

The foregoing objects and advantages of the present invention for a vending machine antirock mechanism may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
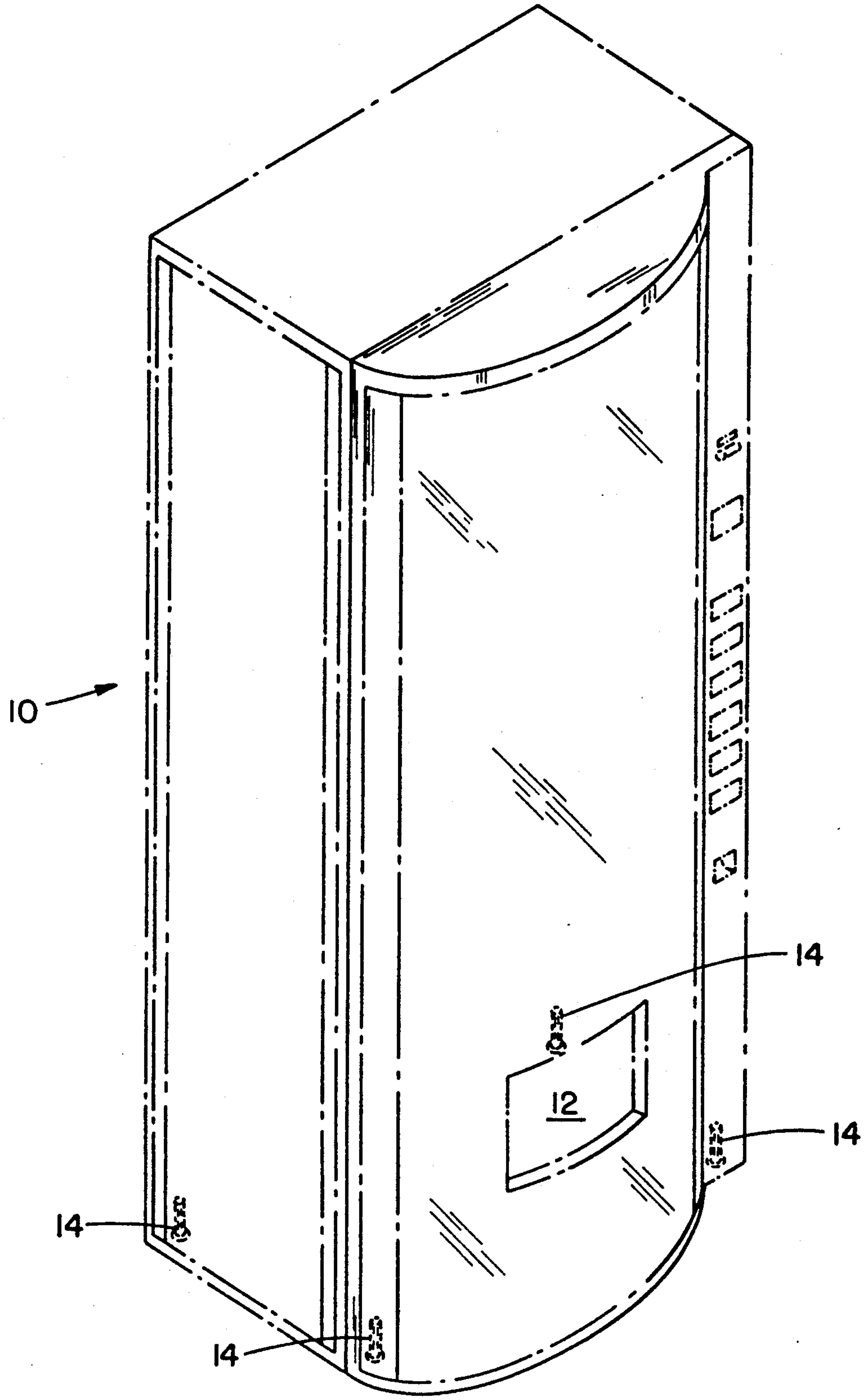
FIG. 1 is a top front, left side perspective view of a typical vending machine for beverages which may be fitted with one or more antirock mechanisms pursuant to the teachings of the present invention.

Referring to the drawings in detail, FIG. 1 illustrates a top front, left side perspective view of a typical vending machine 10 for beverages which can be equipped with one or more antirock mechanisms pursuant to the teachings of the present invention. The vending machine 10 typically has a centrally located product dispensing chute 12, and a potential product pilferer might attempt to rock the vending machine forwardly and backwardly until a sufficient forward tilt of the machine is attained to possibly cause product cans to be dislodged from within the machine and fall into the product dispensing chute.

The vending machine also typically comprises an adjustable leveling bolt leg 14 threadedly engaged into the frame at each corner thereof to provide for leveling of the vending machine. The antirock mechanism of the present invention can employ those threaded frame holes to mount to the vending machine, particularly in retrofit applications to existing vending machines. However, in alternative embodiments, an antirock mechanism could be secured to the vending machine at other locations, such as a central front location.

Figure 2:
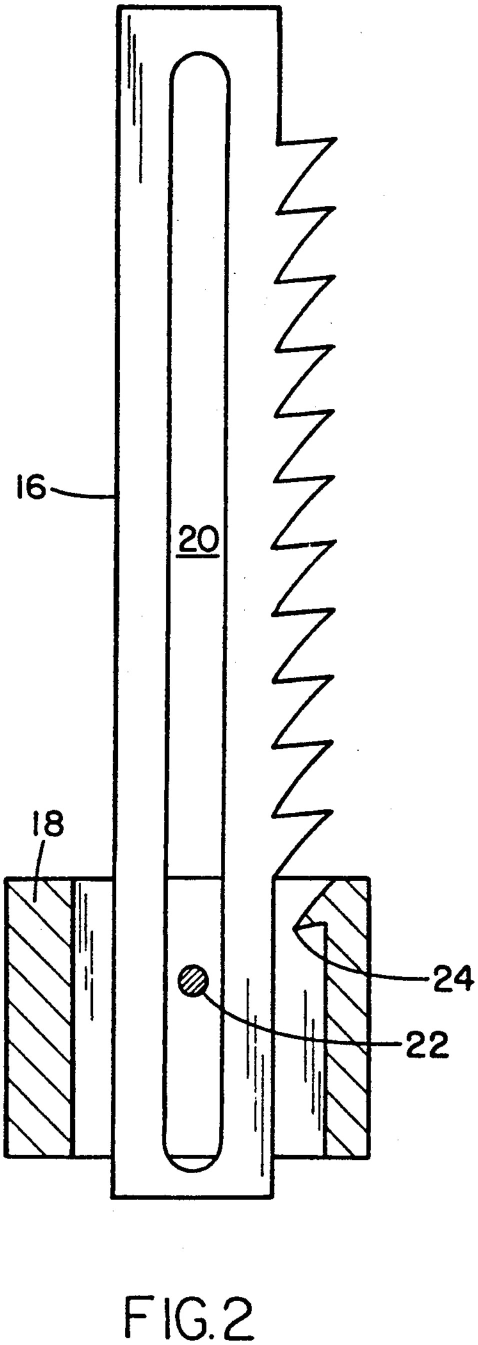
FIG. 2 illustrates a first embodiment of an antirock mechanism of the subject invention, which comprises a sliding ratchet bar.

FIG. 2 illustrates one embodiment of an antirock mechanism employing a sliding ratchet bar 16 which is loosely secured in a ratchet locking mechanism 18 secured to the frame or housing of the vending machine. The ratchet bar has an elongated slot 20 therein along its length which encompasses a guide member 22 of the locking mechanism 18. The locking mechanism can include a spring biased ratchet 24 of conventional design for either sliding or locking engagement with the teeth of the ratchet bar, depending upon whether the direction of movement thereof is downward or upwardly.

One possible advantage of this embodiment is that the ratchet mechanism could also provide for a jack type of stepped lowering of the vending machine after it has been suspended in an initially tilted position by the antirock mechanism.

Figure 3:
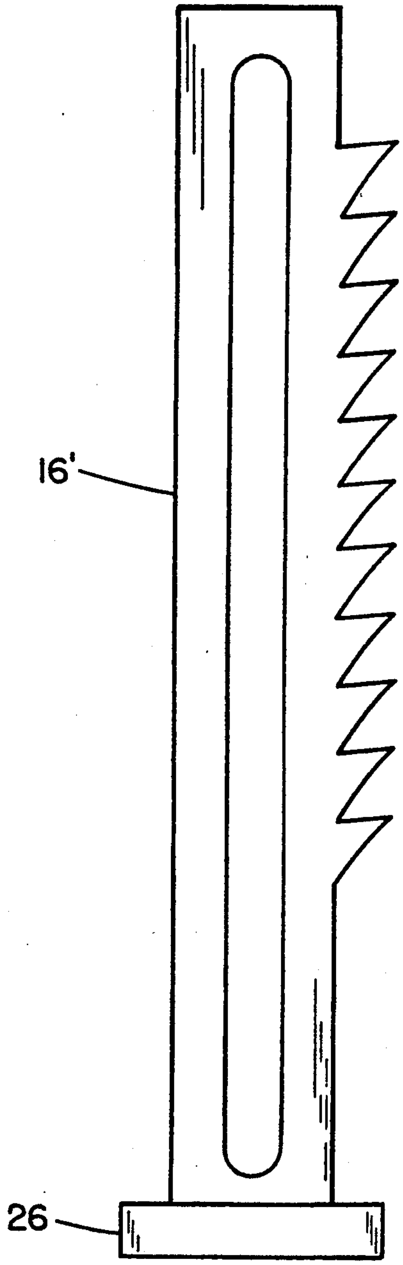
FIG. 3 illustrates a second, slightly modified embodiment of a sliding ratchet bar similar to that of FIG. 2.

FIG. 3 illustrates a second embodiment 16' of the ratchet bar having a closer spacing between the ratchet teeth and a stabilizing foot member 26.

The embodiments of FIGS. 2 and 3 are particularly applicable to an original design of a vending machine (as opposed to a retrofit application) in which the locking mechanism 18 would be integrally secured to the frame or housing of the vending machine, normally at one or more suitable front locations. In operation, if the vending machine is tilted backwardly, the loosely fitting ratchet bar would slide downwardly under its own weight and remain in contact with the floor. As the machine begins to rock forwardly, the ratchet 24 would engage an adjacent ratchet tooth and hold the vending machine in a rearwardly tilted position, possibly in contact with a rear adjacent wall.

Figure 4:
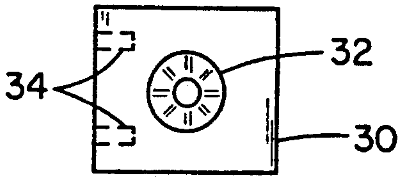
FIGS. 4 and 5 illustrate respectively a top plan view and a front elevational view of a further embodiment of an antirock mechanism.
Figure 5:
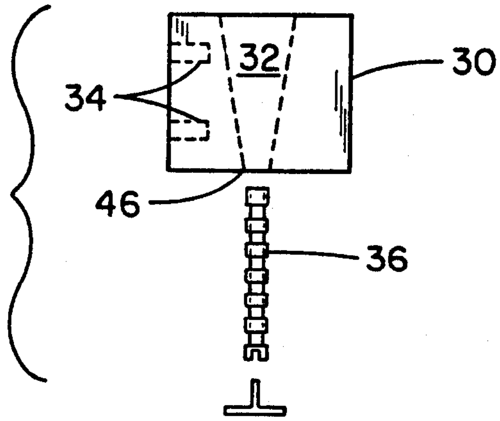
Figure 6:
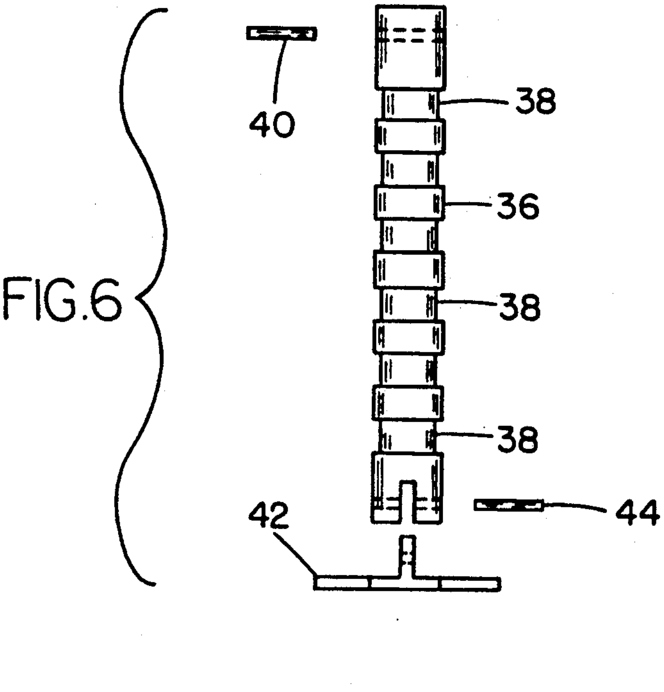
FIG. 6 illustrates a more detailed view of the sliding locking bar shown in FIG. 5.

FIGS. 4 and 5 are respectively a top plan view and an exploded side elevational view of a further embodiment of the present invention, while FIG. 6 illustrates further details of the slideable locking bar thereof. Referring to FIGS. 4 and 5, a locking member 30 having an inverted frustoconical aperture 32 therein is secured to the vending machine frame by attachments 34. The locking member 30 is normally mounted at one or more suitable front locations of the vending machine. A locking bar 36 is loosely positioned in the frustoconical aperture, and has a series of annular locking grooves 38 positioned along its length. The locking bar includes a retaining pin 40 extending through its top to prevent the locking bar from falling completely from the locking member 30, and further includes a base plate 42 pinned thereto at 44. In operation, if the vending machine is tilted rearwardly, the locking bar 36 slides downwardly under its own weight and remains in contact with the floor. As the machine begins to rock forwardly, a locking groove 38 positioned adjacent the bottom edge 46 of the frustoconical aperture 32 would engage that edge and hold the vending machine in a rearwardly tilted position.

Figure 7:
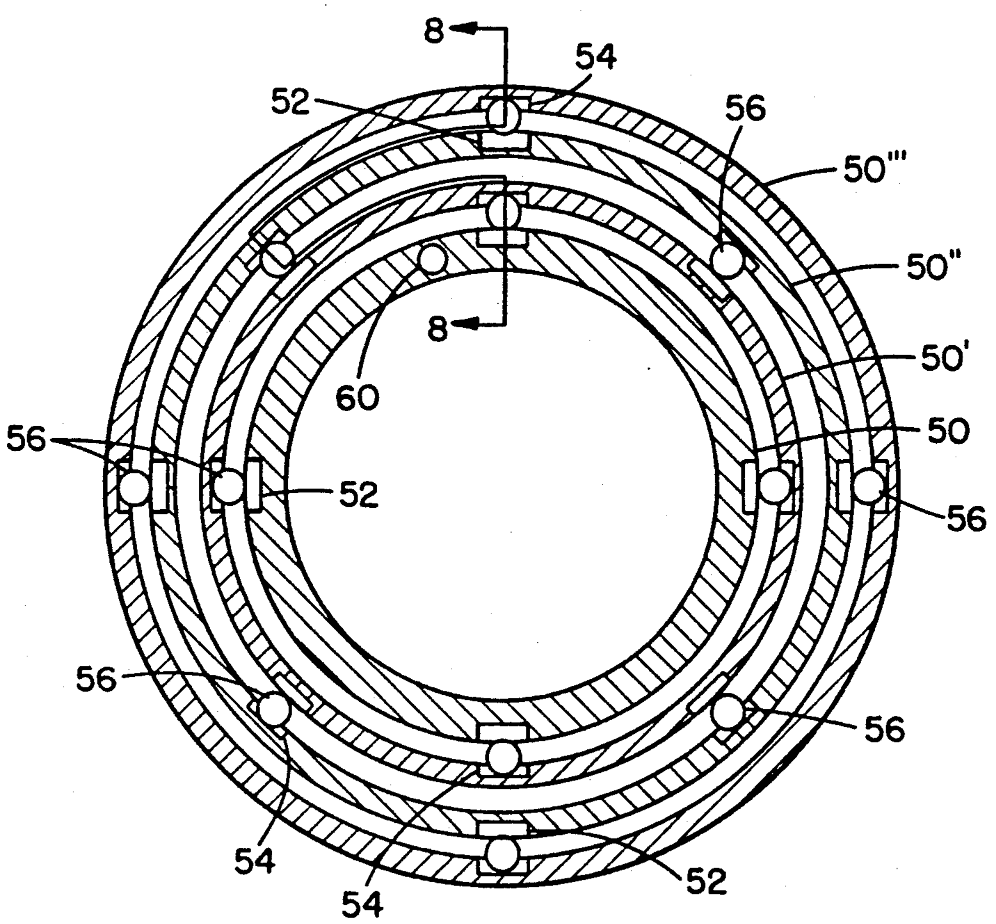
FIG. 7 illustrates a further embodiment of an antirock mechanism of the present invention, which comprises a set of nested cylinders.

FIG. 7 illustrates a further embodiment of an antirock mechanism comprising a set of nested cylinders or rings proceeding from an innermost ring 50, a next outer ring 50', a next outer ring 50'', and an outermost ring 50'''. Rings 50', 50'' and 50''' each have an inwardly facing top annular groove 52 therein, and rings 50, 50' and 50'' each have an outwardly facing lower annular groove 54 therein, each of which has a spherical ball 56 placed therein which is biased outwardly by a spring 58. This embodiment has particular applicability to retrofit situations in which a bolt stud 60 located on the innermost ring 50 is threaded into the machine in place of one or both of the front leveling bolt legs 14. In operation, if the vending machine is tilted rearwardly, the innermost ring 50 is lifted relative to the adjacent ring 50' until the ball 56 in the innermost ring 50 engages the groove 52 in the second ring 50', which then lifts the second ring 50 relative to the third ring 50'' until they lock together, and etc. The grooves 52 and 54 can encircle the ring members or be segmented as illustrated in FIG. 7.

Figure 8:
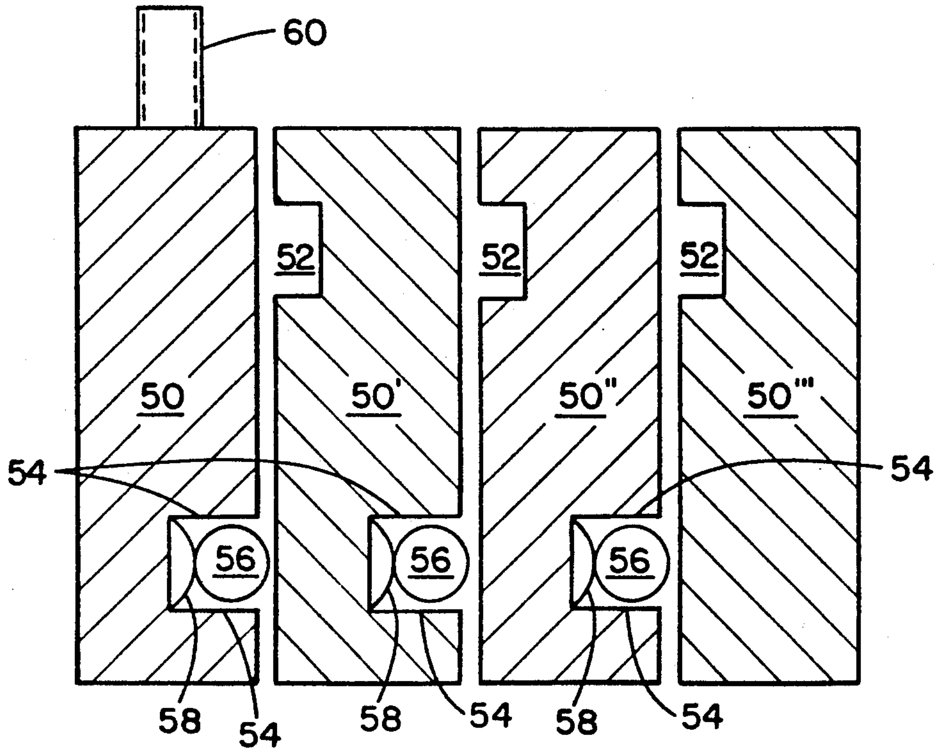
FIG. 8 is a sectional view along sectional line 8—8 through the set of nested cylinders of FIG. 7, and illustrates the operation of this embodiment.
Figure 9:
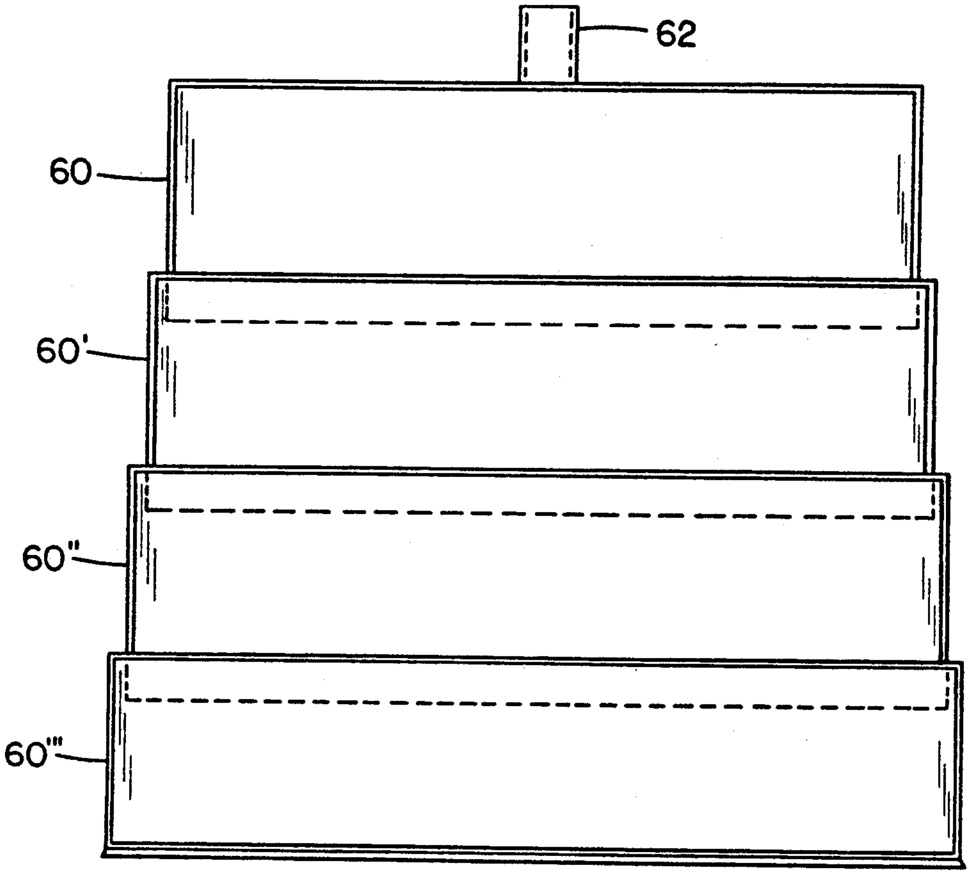
FIG. 9 illustrates another embodiment of an antirock mechanism comprising a telescoping leg assembly.

FIG. 9 illustrates an embodiment of an antirock mechanism similar to that of FIGS. 7 and 8, and comprising a telescoping leg assembly having a series of telescoping legs 60, 60', 60'', and 60''' in which adjacent legs lock relative to each other in an extended position, thereby preventing retraction into each other. The telescoping leg assembly can be mounted to the vending machine by a bolt stud 62 positioned centrally with respect to the upper leg 60.

Figure 10:
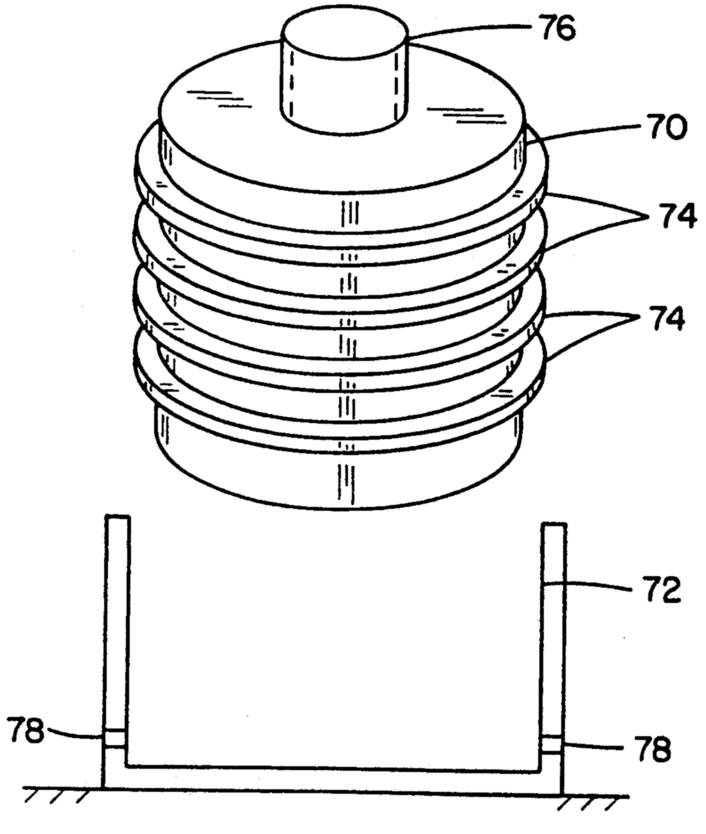
FIG. 10 illustrates a further embodiment of the subject invention comprising a piston and cylinder arrangement in which rings on the piston provide locks as the piston is withdrawn from the cylinder.

FIG. 10 illustrates a further embodiment of the subject invention comprising a piston 70 and cylinder 72 arrangement in which rings 74 on the piston 70 provide successive locks as the piston is successively withdrawn from the cylinder 72. The rings 74 can be C clips or any suitable expanding ring or seal. The antirock mechanism can be mounted to the vending machine by a bolt stud 76 positioned centrally with respect to the piston 70. Vents 78 in the cylinder 72 are provided to allow the piston 70 to be freely withdrawn from the cylinder 72.

Figure 11:
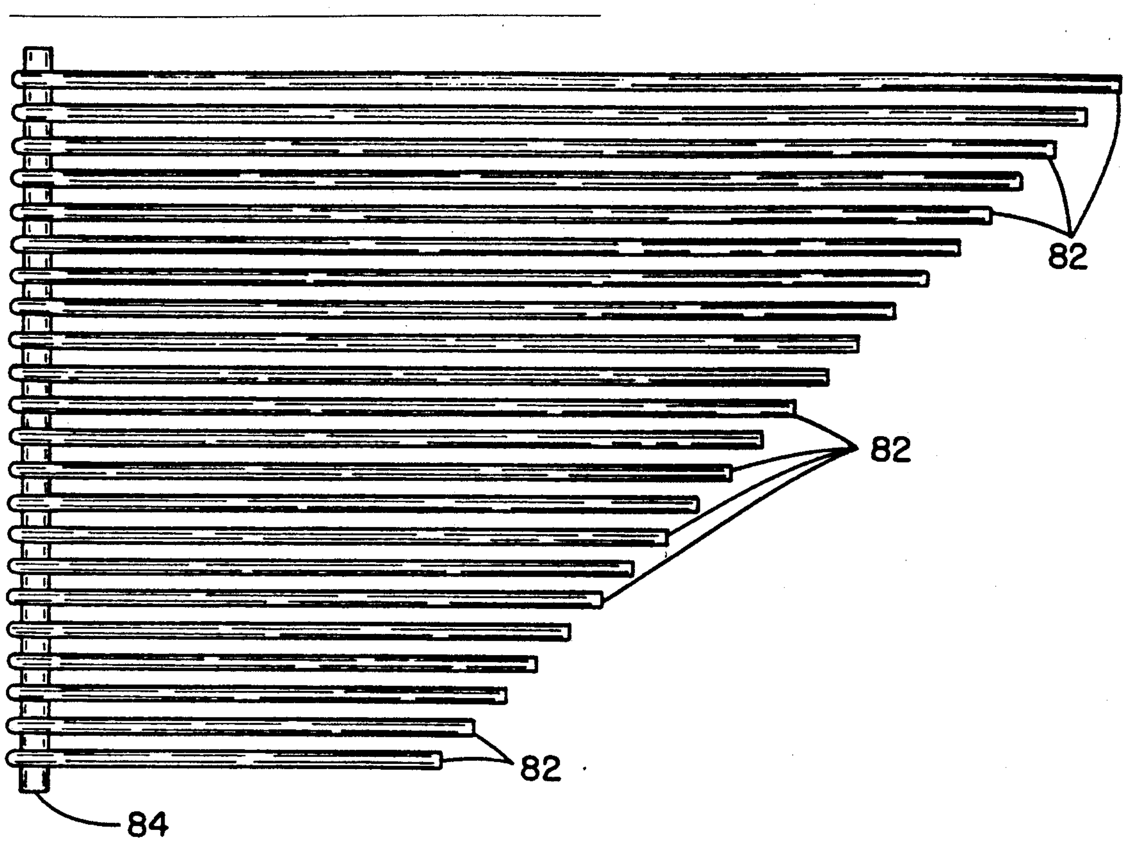
FIG. 11 illustrates another embodiment of an antirock mechanism comprising a plurality of swinging and locking legs of different lengths.
Figure 12:
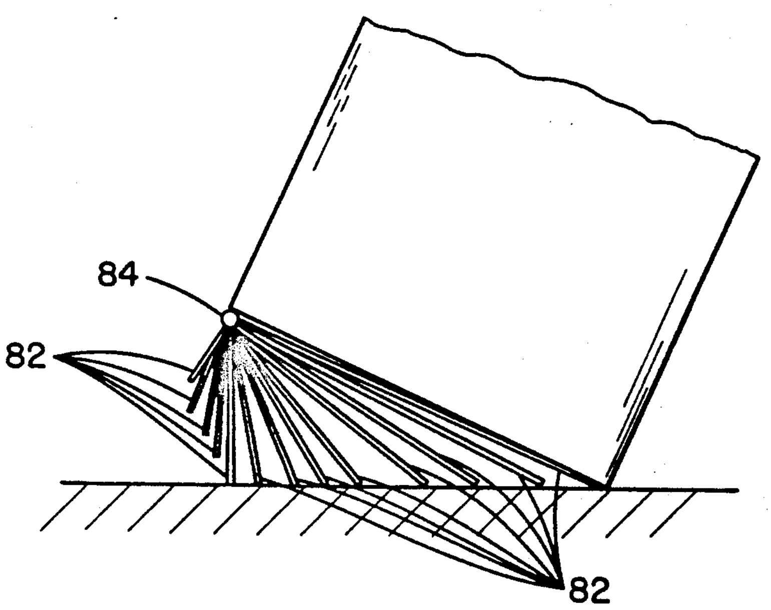
FIG. 12 illustrates the mode of operation of the antirocking mechanism of FIG. 11.

FIG. 11 illustrates another embodiment of an antirock mechanism 80 comprising a plurality of swinging and locking legs 82 of progressively longer lengths which are pivoted about a common hinge 84 mounted along the front of the machine. In operation, as the vending machine is tilted rearwardly, first the shorter legs will swing down into a fully extended and locked position, and as the machine is tilted further, progressively longer legs will swing down into a fully extended and locked position, as illustrated in FIG. 12. The mounting of the legs 82 on the common hinge 84 is similar in concept to a commercially available set of allen wrenches mounted along one central hinge.

Figure 13:
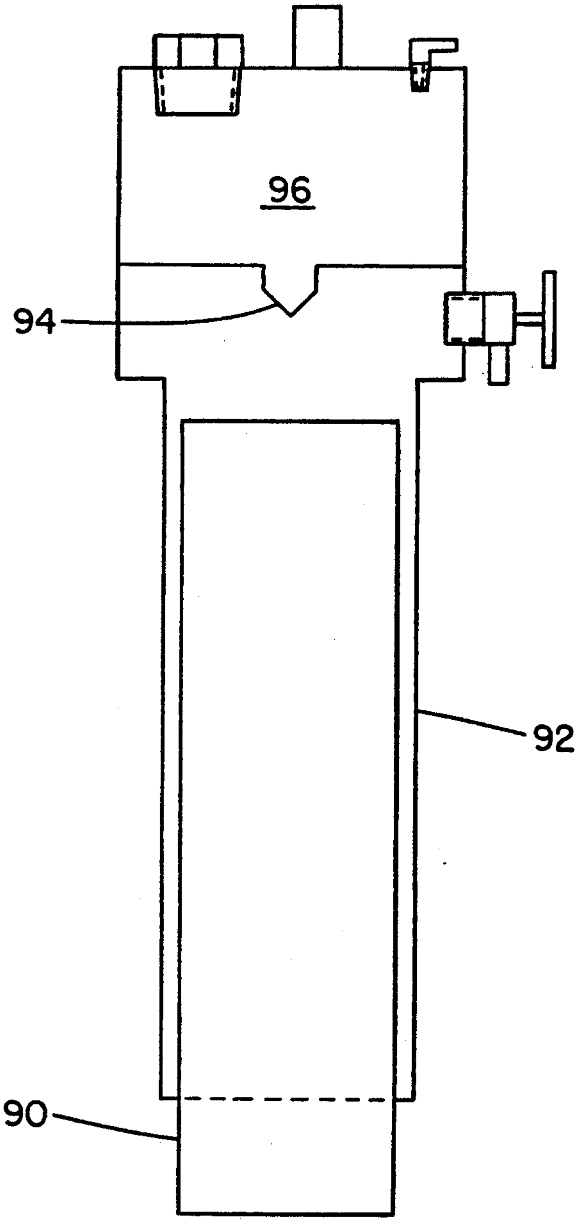
FIG. 13 illustrates a hydraulic embodiment of an antirock mechanism constructed pursuant to the teachings of the present invention.

FIG. 13 illustrates a hydraulic embodiment of an antirock mechanism pursuant to the present invention. The hydraulic antilock mechanism comprises a hydraulic piston 90 mounted in a cylinder 92, supplied with hydraulic fluid through a check valve 94 from a fluid reserve 96. A spring might also be placed in compression between the piston and cylinder to assist in a rapid extension thereof, as well as in other embodiments described hereinabove. In operation, as the vending machine is tilted, piston 90 drops from cylinder 92, and oil from the reserve 96 passes through the check valve 94 and fills the space vacated by the piston. The check valve 94 prevents the hydraulic flow from reversing, thereby locking piston 90 in whatever extended position it achieves.

While several embodiments and variations of the present invention for an antirock mechanism for a vending machine are described in detail herein, it should be apparent that the disclosure and teachings of the present invention will suggest many alternative designs to those skilled in the art.

What is claimed is:

1. An antirock mechanism for a vending machine, to prevent rocking of the vending machine, which is heavy when filled with vended products and might lead to tipping over of the vending machine and injury to persons in immediate proximity to the vending machine, comprising:

a. a vending machine for vending consumer products and having a base;

b. at least one antirock mechanism attached to the base of said vending machine, said antirock mechanism comprising at least one vertically movable antirock member, vertically movable relative to a locking member secured to the vending machine, with the movable antirock member moving vertically downwardly relative to the locking member when the vending machine is tilted or rocked and locking relative to the locking member in the vertical downward position to hold or support the vending machine in a subsequent tilted position to prevent oscillatory rocking of the vending machine.

2. An antirock mechanism for a vending machine as claimed in claim 1, said vertically movable antirock member comprising a vertically slideable ratchet bar supported for vertical downward movement when the vending machine is tilted or rocked and having a plurality of ratchet teeth positioned along its length, and said locking member engaging and locking relative to said ratchet teeth after the vending machine is initially tilted.

3. An antirock mechanism for a vending machine as claimed in claim 2, said ratchet bar having an elongated slot extending along its length in which a guide member of said locking member is slideably engaged.

4. An antirock mechanism for a vending machine as claimed in claim 1, said locking member defining an inverted frustoconical aperture therein, and a vertically slideable antirock member loosely positioned therein for vertical downward movement when the vending machine is tilted, and having a plurality of spaced grooves along its length, one of which engages the bottom of said inverted frustoconical aperture to lock and support the vending machine in an initial tilted position.

5. An antirock mechanism for a vending machine as claimed in claim 1, said antirock mechanism comprising a plurality of nested vertically slideable members, each of which can lock in a vertical downward position relative to an adjacent nested slideable member.

6. An antirock mechanism for a vending machine as claimed in claim 5, said plurality of nested vertically slideable members comprising a plurality of nested cylindrical members.

7. An antirock mechanism for a vending machine as claimed in claim 1, said antirock mechanism comprising a piston having a plurality of spaced expandable rings mounted thereon and positioned in a cylinder, such that as the vending machine is initially tilted, the piston is withdrawn from the cylinder and said plurality of spaced expandable rings expand as they are withdrawn from the cylinder and prevent the piston from retracting back into the cylinder.

8. An antirock mechanism for a vending machine as claimed in claim 1, said antirock mechanism comprising a piston mounted in a cylinder, and the volume defined between the piston and cylinder communicating with a reservoir of hydraulic fluid through a one way check valve, thereby allowing the piston to withdraw from the cylinder as the vending machine is initially tilted, but not allowing the piston to retract into the cylinder.

9. An antirock mechanism for a vending machine as claimed in claim 1, said antirock mechanism comprising a plurality of different length legs pivoted about a common pivot which extends along the front of the vending machine.

10. An antirock mechanism for a vending machine as claimed in claim 1, said vending machine comprising a soft drink container vending machine.

* * * * *